April 12, 1960     K. R. SYMON     2,932,797
IMPARTING ENERGY TO CHARGED PARTICLES
Filed Jan. 3, 1956     5 Sheets-Sheet 1

INVENTOR
KEITH R. SYMON

BY *Harold T. Stowell*

ATTORNEY

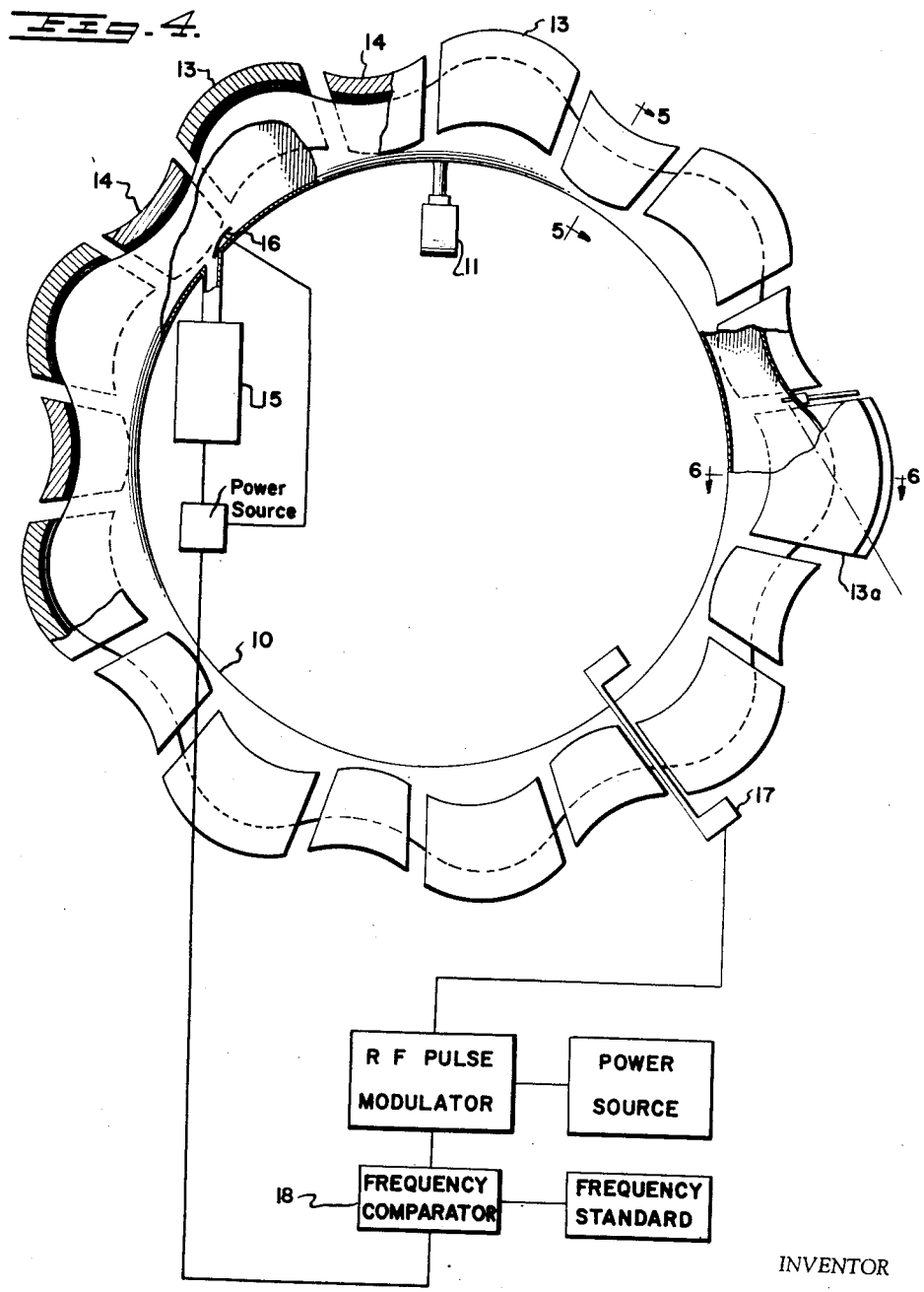

April 12, 1960     K. R. SYMON     2,932,797
IMPARTING ENERGY TO CHARGED PARTICLES
Filed Jan. 3, 1956     5 Sheets-Sheet 3
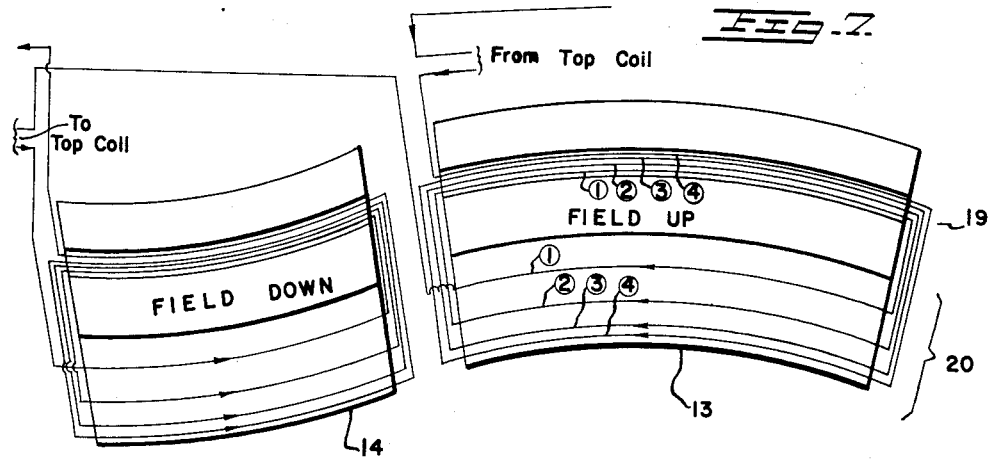
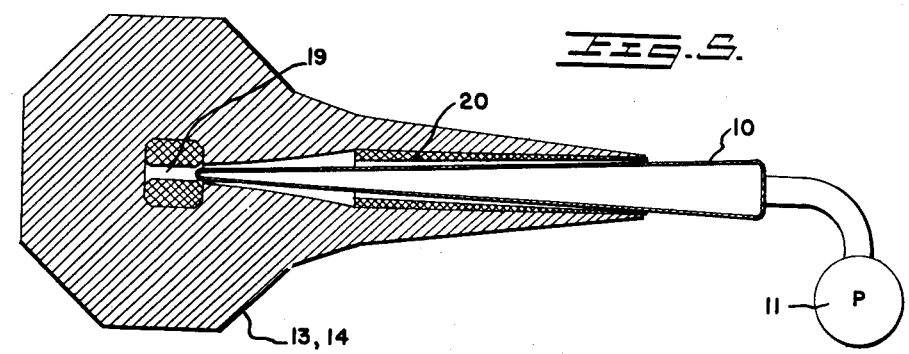
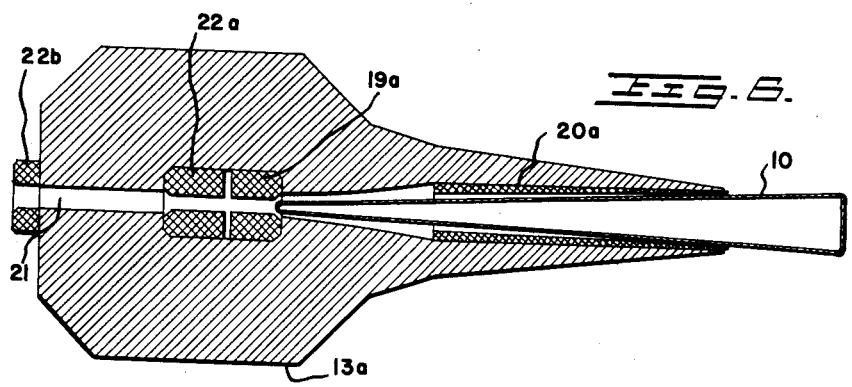
INVENTOR
KEITH R. SYMON
BY *Harold T. Stowell*
ATTORNEY

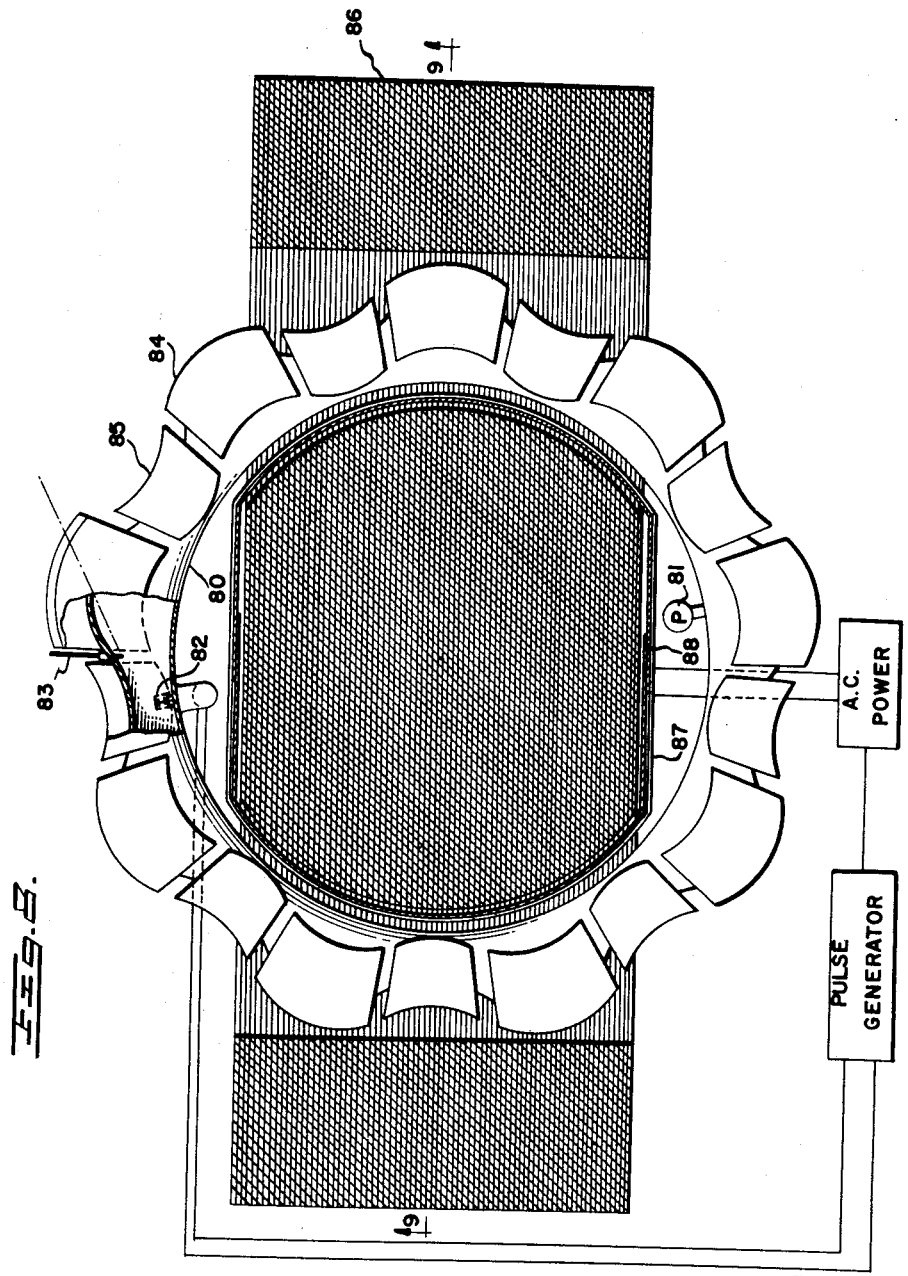

April 12, 1960 K. R. SYMON 2,932,797
IMPARTING ENERGY TO CHARGED PARTICLES
Filed Jan. 3, 1956 5 Sheets-Sheet 5

INVENTOR
KEITH R. SYMON
BY
ATTORNEY

United States Patent Office 2,932,797
Patented Apr. 12, 1960

2,932,797
IMPARTING ENERGY TO CHARGED PARTICLES

Keith R. Symon, Madison, Wis., assignor to Research Corporation, New York, N.Y., a corporation of New York Application January 3, 1956, Serial No. 556,897

6 Claims. (Cl. 328—233)

This invention relates to a method and apparatus for imparting energy to charged particles.

A general purpose of the invention is the provision of a method and apparatus whereby high intensity supplies of highly energized particles may be obtained. Other purposes and objects will appear from the following description.

The method of the invention generally comprises injecting charge particles into an annular focussing field, the spatial gradient of which varies periodically in azimuth about the annulus and accelerating the particles in said focussing field by a time-variant electric field. The azimuthal variation in gradient of the focussing field may be effected by alternately reversing the polarity of the field in successive sectors of the annulus or by varying the intensity of the field from point to point in an azimuthal direction without reversal of polarity.

Apparatus of this type may be designated, and distinguished from other types of particle accelerators, by the term "fixed field alternating gradient particle accelerators" or FFAG accelerators.

Alternating gradient focussing provides a high degree of stability for both the radial and vertical modes of betatron oscillations in circular particle accelerators. This stability makes possible the construction of many kinds of circular accelerators with magnetic guide fields which are constant in time. These machines contain stable equilibrium orbits for all particles from the injection energy to the output energy. These orbits may all be in an annular ring, as in a synchrotron or betatron; the magnetic field must then change rapidly with radius to provide orbits for the different energy particles. If the guide field gradient is made independent of azimuth, one of the modes of betatron oscillation is clearly unstable. Application of alternating gradient focussing, however, can keep both modes of betatron oscillation stable even with the rapid radial change of magnetic field.

Two types of FFAG design are particularly advantageous. The radial sector type achieves AG focussing by having the fields in the successive focussing and defocussing magnets vary in the same way with radius but with alternating signs (or in certain cases alternating magnitudes). Since the orbit in the reverse field magnet bends away from the center, the machine is considerably larger than a conventional AG machine of the same energy having an equal peak magnetic field. This disadvantage is largely overcome in the spiral sector type in which the magnetic field consists of a radially increasing azimuthally independent field on which is superimposed a radially increasing azimuthally periodic field. The peaks and troughs of the periodic field spiral outward at a small angle to the orbit. The radial separation between peaks is small compared to the radial aperture. The particle, crossing the field ripples at a small angle, experiences alternating gradient focussing. Since the fields need not be anywhere reversed, the size of this machine can be comparable to that of an equivalent conventional AG machine. Machines of the spiral sector type are more particularly described in the copending application of Donald W. Kerst and Keith R. Symon.

FFAG synchrotrons have a number of important advantages over conventional synchrotrons. A major one is beam intensity. Since the magnetic field is time independent in an FFAG synchrotron, the beam pulse rate is determined only by the repetition rate of the radio frequency modulation cycle. In a conventional synchrotron, the beam pulse rate is limited by the time to complete the pulsed magnetic field cycle, while in an FFAG synchrotron cycle repetition rates can be made considerably higher than field recycling rates. Another reason for high beam intensity is the large injection aperture possible in the FFAG designs. Other advantages of the FFAG synchrotron are engineering and maintenance simplifications. The direct current magnet power supply is simpler and cheaper than a pulsed supply to construct and to maintain. The magnets do not have to be laminated; there are no eddy current problems; and remanent field and saturation difficulties are less serious. Field trimming is all time independent. The necessity for accurate tracking of the RF accelerating voltage with a pulsed magnetic field is eliminated with a resulting greater freedom and ease in design of the RF system. Injection is possible at a lower energy than in a conventional synchrotron because of the fewer low field problems and the easier frequency modulation program; complexity of the injection system will then be decreased.

Fixed field betatrons have a much higher intensity than conventional betatrons. The beam can be injected for a considerable fraction of a cycle rather than the few tenths of a microsecond presently possible. The only beam current limitation appears to be space charge at injection, and this may be decreased by such techniques as high voltage injection. An FFAG betatron has no problems of tracking a pulsed guide field with the accelerating flux, and has also other engineering simplifications mentioned in the synchrotron case.

The invention will be more particularly described with reference to the accompanying drawings in which:

Fig. 1 is a diagram in plan of a radial sector alternating gradient focussing field according to the principles of the invention;

Figs. 2 and 3 are diagrams in radial section of the alternating sections of the focussing field on lines 2—2 and 3—3 of Fig. 1, respectively;

Fig. 4 is a diagrammatic plan view with parts broken away of a synchrotron embodying the principles of the invention;

Fig. 5 is a median radial section through the magnet ring and vacuum tube on line 5—5 of Fig. 4;

Fig. 6 is a median radial section through the magnet ring at an ejection point on line 6—6 of Fig. 4;

Fig. 7 is a plan view of the lower halves of a pair of radial sector alternating gradient magnets forming a complete sector, showing a typical method of winding;

Fig. 8 is a horizontal section through a betatron embodying the principles of the invention.

Figure 1:
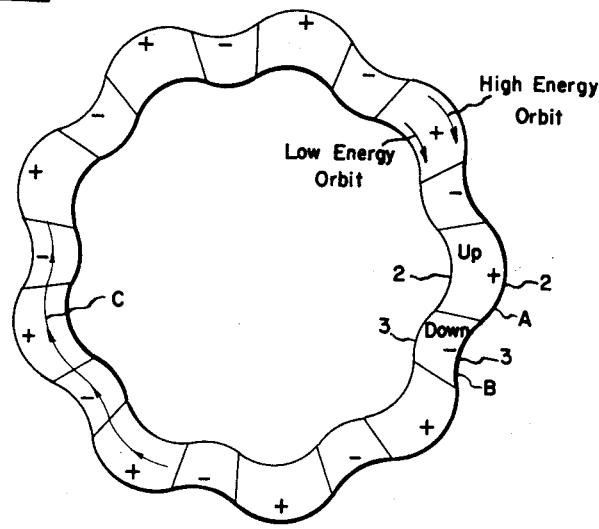
Figure 2:
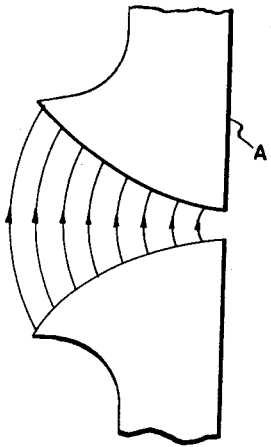
Figure 3:
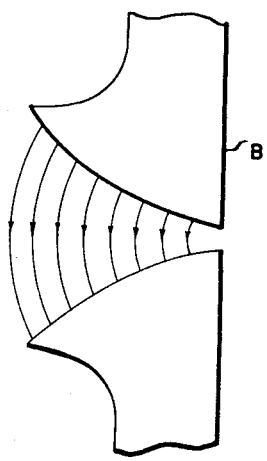

Figs. 1-3 diagrammatically illustrate the principles of the fixed field alternating gradient focussing fields of the invention in the radial sector form. As appears from the figures, the annular focussing field comprises alternate half-sectors A (Fig. 2) and B (Fig. 3). In all of the magnets the gaps become smaller with increasing radius. The gradient of the magnetic field in adjacent magnets is reversed by reversing the direction of the current in the coils of the short magnets B (Fig. 3) with respect to the long magnets A (Fig. 2). By making the negative magnets B shorter than the positive magnets the charged particle progresses around the center of the machine in an orbit diagrammatically indicated at C.

The effect of the A half-sectors is radially focussing and vertically defocussing and that of the B half-sectors is vertically focussing and radially defocussing; the net effect of the combined half-sectors, however, is focussing both radially and vertically.

A ring of the reversed field magnets has a generally low field around the inside edge of the ring and a generally high field around the outside edge. Thus when the magnets are energized continuously with direct current, orbits of high energy particles can be maintained with orbits of low energy particles within the gap of the magnets. A low energy particle started in its orbit at the inside radius will seek the position of higher energy orbits at larger radii as it is accelerated. The beam current output from such an accelerator can be much greater than from conventional accelerators because the magnets are at all times able to guide particles of any energy, whereas the conventional accelerator which can not contain particles with a large difference of energy must have a magnetic field which rises as the momentum of the particle increases. Thus the conventional accelerator can give intermittent bursts of particles only when the magnets are pulsed. An FFAG accelerator has its intensity determined mainly by the rapidity with which the radio frequency modulation cycle can be repeated. This can be done at least ten times more frequently than the pulsing rate of a conventional accelerator.

In the FFAG synchrotron shown in Figs. 4–7, an annular vacuum tube 10 having a greater radial than axial extension and having its largest axial dimension adjacent its inner edge and its smallest axial dimension adjacent its outer edge is positioned in the gap of the magnet ring. The tube may be evacuated by means of one or more vacuum pumps 11.

The magnet ring is comprised of alternate half-sectors 13 (radially focussing, A-type) and 14 (vertically focussing, B-type). The ratio of the radial lengths of the radially focussing half-sectors 13 to the vertically focussing half-sectors 14 is 3/2 and the fields produced in the gaps of the two types of half sectors are equal and opposite, although other length ratios and unequal field, for example, equal lengths and field ratios of 3/2 are feasible.

The shapes of the half-sectors along their medial vertical planes are the same for all half-sectors of both types, as shown in Fig. 5, except for the provision in one or more half-sectors 13a of ejection slots and auxiliary ejection windings as shown in Fig. 6.

The half-sectors are spaced apart by radial slots which can be utilized for the insertion of targets, probes and the like.

An ion gun 15, which may be, for example, a Van de Graaf accelerator, is connected to the inner edge of the vacuum tube with an inflecting electrode 16 positioned inside the tube to bend the incoming particles into their orbits.

The particles are accelerated by modulated radio frequency pulses, for example, by means of a frequency modulated accelerating cavity 17 positioned around the vacuum tube 10 in one of the intersector gaps. The ion gun 15 and inflector electrode 16 are energized and de-energized at suitable frequencies of the modulated RF pulse through frequency comparator 18.

Referring more particularly to Figs. 5–7, it will be seen that the magnet half-sectors, in addition to the main windings 19, are provided with back-windings 20 which very greatly reduce the contouring of the iron poles necessary to obtain the desired fall-off in field, indicated diagrammatically in Figs. 2 and 3.

A typical winding scheme to provide reversal of field in adjacent half-sectors and the desired back-windings in the pole face extensions is shown in Fig. 7.

Fig. 6 shows a half-sector 13a modified by provision of an ejection slot 21 and auxiliary ejection coils 22a, 22b.

Typical data of a 10 bev. FFAG proton accelerator of the type shown in Figs. 4–7, supplied with protons at 5 mev. from a Van de Graaf accelerator, are as follows:

|  | At Injection | At Maximum Energy |
|---|---|---|
| Proton energy | 5 mev | 10 bev. |
| Magnetic field in median plane | 200 gauss | 20,000 gauss. |
| Overall radius | 95 meters | 97.3 meters. |
| Vertical aperture of vacuum chamber | 30 cm | 6 cm. |
| Radial aperture of vacuum chamber |  | 2.3 meters. |
| Number of sectors or magnet pairs |  | 64. |
| Length of positive magnets |  | 4.76 meters. |
| Length of negative magnets |  | 2.98 meters. |
| Magnet iron |  | 9,650 tons. |
| Copper in magnet cores |  | 670 tons. |
| Magnet excitation power |  | 5.5 megawatts. |
| Ampere turns of current |  | 112,000. |
| Current density in magnet coils |  | 1,400 amp. turns/in.² |
| Yield |  | ~$10^{11}$ protons per pulse. |
| Pulse rate |  | ≦1 per second. |

The fundamental frequency of revolution of 5 mev. protons injected at the 95 meter radius is 52.6 kc. per second and the fundamental frequency at 10 bev. at the 97.3 meter radius is 495 kc. per second. The RF pulse modulator can be operated, for example, at the hundredth harmonic of the frequency of revolution, the pulses being modulated from 5.26 mc. per second up to 49.5 mc. per second. A pulse of 5 mev. protons is injected at the beginning of each frequency modulation cycle and pulse frequency rate of, for example, ten pulses (and ten frequency modulation cycles) per second may be used.

Figure 9:
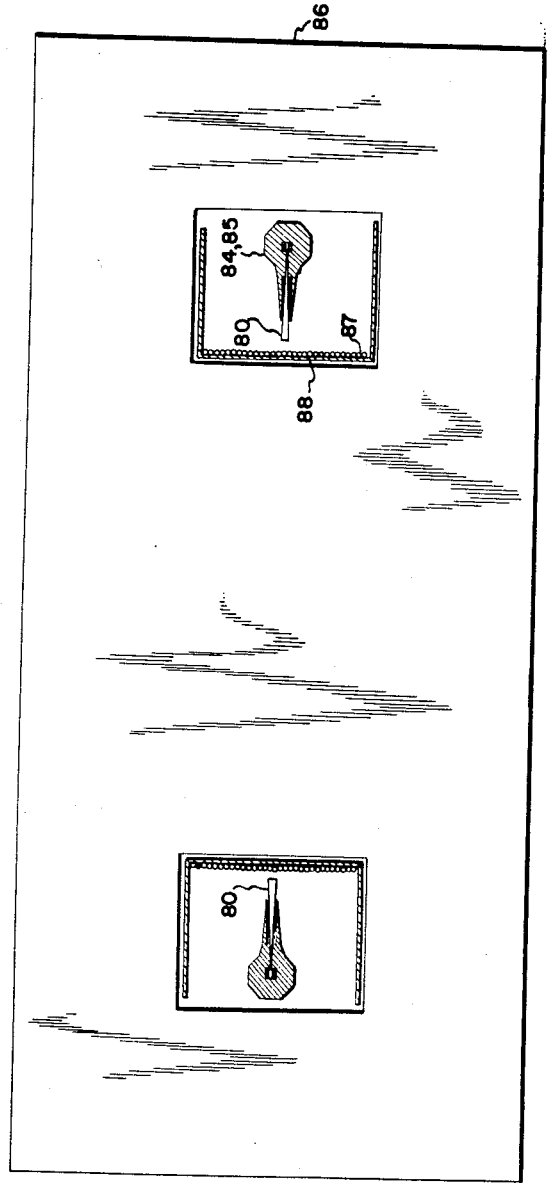
Fig. 9 is a vertical section on line 9—9 of Fig. 8.

Figs. 8 and 9 show a betatron constructed in accordance with the principles of the invention. As is well known, betatron accelerators operate on the transformer principle, the stream of electrons in the annular vacuum chamber acting as a single turn secondary winding. Previous machines of this type have involved the application of time-varying magnetic fields resulting in a low duty cycle and consequently low intensity. The application to the betatron of the FFAG principle of the present invention makes possible much higher duty cycles of 25 to 30% and correspondingly higher output intensities.

In the machine illustrated in Figs. 8 and 9, an annular vacuum chamber 80, provided with one or more vacuum pumps 81, an electron injector 82 and a target 83, is positioned in a fixed field alternating gradient magnet ring composed of alternate positive and negative half-sectors 84 and 85 wound and energized as described in connection with the synchrotron machine of Figs. 4–7.

The annular chamber and magnet ring are positioned within the continuous iron core structure 86 and a primary coil 87 supplied with alternating (for example, 60 cycle) current is wound around the central leg of the core structure. A copper shield 88, split along one or more vertical lines, is preferably provided around the central leg of the core to prevent flux leakage between the core and the inner edge of the annular chamber.

The electron gun is energized in synchronism with the alternating current supply to coil 87, so as to inject electrons at the low energy (inner) radius of the annular chamber 80, beginning as the accelerating flux begins to rise and continuing for about 25 to 30% of the alternating current cycle.

The following are design and operating data of a typical FFAG betatron of the type shown in Figs. 8 and 9:

| | |
|---|---|
| Injection energy | kev __ 50 |
| Maximum energy | mev __ 100 |
| Guide field strength | gauss __ 10,000 |
| Injection radius | cm __ 98 |
| Radius at maximum energy | cm __ 130 |
| Number of magnet sectors | __ 20 |
| Ampere turns of current | __ 2,000 |

The invention has been more particularly described for the purpose of illustrating the principles thereof with respect to embodiments in which the guiding or focussing fields are magnetic and in which the focussing field strengths increase with increasing radius. However, electric focussing fields may also be used by applying electric potentials between field electrodes shaped and positioned similarly in principle to the field pole members described in the foregoing.

Also in the case of the radial sector focussing fields of alternately reversed polarity, the field may decrease with radius so that the low energy orbit is at the outer radius of the guide field and the high energy orbit is at the inner orbit.

While in the particular embodiments described above the focussing field is maintained constant with time, the effect of the field forms obtained with the field producing means of the invention in greatly reducing the radial spread of the orbits of particles over a wide range of energies can be effectively utilized with pulsed fields with the result of very substantially decreasing the pulse amplitude required. This would be particularly advantageous in improving the operation of existing particle accelerating machines. For example, in the case of a betatron requiring a magnetic field rise by a factor of about one thousand during acceleration when operated as a purely pulsed betatron, replacement of the conventional magnet system by a ring of radial sector magnets of the type illustrated in Figs. 8 and 9 could readily decrease the orbital spread of the injected electrons by a factor of 3. The amplitude of the field pulses applied to the magnets could be decreased to one-third that required in the present machines, which represents a very substantial and important decrease in the amount of pulsed electric energy which must be handled.

I claim:

1. Apparatus for imparting energy to charged particles comprising a source of charged particles, an evacuable vessel providing an annular orbital path for particles from said source, a magnetic system effective to produce a time-invariant magnetic flux linking said path and varying periodically in azimuth about said path thereby to maintain said particles within said path in spite of their changing energy, and means for impressing a frequency-modulated alternating electric field on the particles in said path.

2. Apparatus for imparting energy to charged particles comprising a source of charged particles, an evacuable vessel providing an annular orbital path for particles from said source, means for injecting successive pulses of charged particles from said source into said path, a magnetic system effective to produce a time-invariant magnetic flux linking said path and alternating periodically in azimuth about said path thereby to maintain said particles within said path in spite of their changing energy, and means for impressing a frequency-modulated alternating electric field on the particles in said path in synchronism with said pulses.

3. Apparatus as defined in claim 1 wherein the magnetic system comprises a plurality of pairs of magnets positioned about said evacuable vessel with said orbital path between the poles thereof, each magnet of each pair producing a magnetic flux linking said path in opposite axial direction from that of the other magnet of the pair.

4. Apparatus as defined in claim 3 wherein the fields produced by said magnets increase in strength with increasing radial distance through said path.

5. Apparatus as defined in claim 4 wherein the main energizing windings of the magnets are positioned adjacent the outer radial edge of said path.

6. Apparatus as defined in claim 5 wherein radially inward extending legs of said magnets are backwound with respect to the main windings to effect a reduction of the magnetic field strength in the radially inward direction.

References Cited in the file of this patent

UNITED STATES PATENTS

| | | |
|---|---|---|
| 1,645,304 | Slepian | Oct. 11, 1927 |
| 2,473,477 | Smith | June 14, 1949 |
| 2,510,448 | Wideroe | June 6, 1950 |
| 2,572,551 | Wideroe | Oct. 23, 1951 |
| 2,736,799 | Philos | Feb. 28, 1956 |
| 2,882,396 | Courant et al. | Apr. 14, 1959 |

OTHER REFERENCES

Review of Scientific Instruments (September 1953), pp. 779–805; page 779 relied on.